US007347600B2

(12) United States Patent
Albou

(10) Patent No.: US 7,347,600 B2
(45) Date of Patent: Mar. 25, 2008

(54) LIGHTING MODULE FOR A VEHICLE HEADLIGHT

(75) Inventor: Pierre Albou, Bobigny (FR)

(73) Assignee: Valeo Vision, Bobigny Cedex (FR)

( * ) Notice: Subject to any disclaimer, the term of this patent is extended or adjusted under 35 U.S.C. 154(b) by 36 days.

(21) Appl. No.: 10/975,739

(22) Filed: Oct. 28, 2004

(65) Prior Publication Data

US 2005/0094402 A1 May 5, 2005

(30) Foreign Application Priority Data

Oct. 31, 2003 (FR) .................................. 03 12833

(51) Int. Cl.
*B60Q 1/04* (2006.01)
*F21V 7/00* (2006.01)

(52) U.S. Cl. ....................... 362/517; 362/518; 362/545

(58) Field of Classification Search ................ 362/240, 362/241, 297, 298, 346, 347, 516, 517, 518, 362/539, 544, 545, 800
See application file for complete search history.

(56) References Cited

U.S. PATENT DOCUMENTS 6,419,380 B2 * 7/2002 Oyama et al. .............. 362/517
2005/0117363 A1 * 6/2005 Yamamura et al. ......... 362/518

FOREIGN PATENT DOCUMENTS

| | | |
|---|---|---|
| DE | 202 06 833 | 7/2002 |
| EP | 0 126 281 | 11/1984 |
| EP | 0 376 398 | 7/1990 |
| EP | 1 126 210 | 8/2001 |
| EP | 1 357 332 | 10/2003 |
| JP | 9-219104 | 8/1997 |

* cited by examiner

*Primary Examiner*—Y. My Quach-Lee
(74) *Attorney, Agent, or Firm*—Morgan & Finnegan LLP

(57) ABSTRACT

A lighting module for a vehicle headlight for producing a lighting beam of the type having a cut-off. The module is adapted for use with light emitting diodes and has a first reflector including an elliptical surface for reflecting light rays. The lighting module includes a second reflector for producing a first portion of the cut-off beam that passes through a second focus of the first reflector. The lighting module also includes a third reflector for producing a second portion of the cut-off beam, the optical axis of which passes through the second focus of the reflector. The lighting module further includes a bender, or fourth reflector, having a cut-off edge arranged between the second reflector and the third reflector.

26 Claims, 7 Drawing Sheets

LIGHTING MODULE FOR A VEHICLE HEADLIGHT

FIELD OF THE INVENTION

The present invention relates to a lighting module for a vehicle headlight, for producing a lighting beam of the cut-off type, which is, in particular, adapted for use with light emitting diodes.

BACKGROUND OF THE INVENTION

A lighting beam with cut-off is to be understood to mean a lighting beam which has a directional limit or cut-off line above which the intensity of the light emitted is weak. The functions of passing or dipped-beam lights, and anti-fog lights, are examples of light beams with cut-off in accordance with current European legislation.

Generally, in an elliptical headlight, the cut-off is achieved by means of a mask, which is formed from a vertical plate the profile of which is suitably adapted, and which is interposed axially between the elliptical reflector and the convergent lens, the mask being arranged in the vicinity of the second focus of the reflector.

The mask occults the light rays issued from the light source, which are reflected by the reflector towards the lower part of the focal plane of the convergent lens and which would, in the absence of the mask, be emitted by the headlight above the cut-off line.

However, such a solution does have certain difficulties.

Thus, one disadvantage of this type of headlight is that a significant part of the light flux emitted by the light source is dissipated in the rear face of the mask.

Another solution consists in making a lighting module which makes use of a light source and a Fresnel optic, or a reflector of the complex surface type. In order to create a cut-off it is necessary to align the edges of the images of the light source on the measuring screen which is used for statutory testing of the lighting beam.

This solution again has certain problems.

Thus, where the light source is a diode, it is very difficult to produce a clean cut-off. In this connection, the image of the virtual source that corresponds to the diode is generally round and is diffuse, and it is far more complicated to produce a clean cut-off by aligning the corresponding images of round form.

This difficulty can be overcome by making use of a diaphragm with the diode, but a large quantity of the light energy produced by the diode is then lost.

In addition, those emission indicators of the diodes that are known to have the best performance are complex, and the production of a homogeneous beam is very difficult to obtain from direct images of the diode.

SUMMARY OF THE INVENTION

The present invention aims to provide a lighting module for a vehicle headlight which produces a lighting beam of the type having a cut-off and enabling a clean cut-off to be obtained, in particular by making use of a diode as light source, together with a homogeneous light beam, while at the same time offering a reduction in the amount of light flux lost, by eliminating the use of a mask.

To this end, the present invention proposes a lighting module for a vehicle headlight, for producing a first lighting beam of the cut-off type, and comprising:

- a first reflector having a surface for reflecting light rays the cut-off of which is an ellipse in one plane, and
- at least a first light source disposed close to the first focus of the said first reflector, characterised in that the said module comprises:

- a second reflector for producing a first portion of the cut-off beam and having an optical axis passing through the second focus of the said first reflector,
- a third reflector for producing a second portion of the cut-off beam and having an optical axis passing through the second focus of the said first reflector, and
- a fourth reflector, referred to as a bender, which is arranged between the said second reflector and the said third reflector and comprising:
  - an edge, referred to as a cut-off edge, which is arranged in the vicinity of the said second focus of the said first reflector, whereby to form the cut-off in the lighting beam, and
  - a reflective top face which contains the said respective optical axes of the said second and third reflectors.

Thanks to the invention, the greater part of the light flux emitted by the light source is used in the light beam produced by the module.

In addition, the lighting module according to the invention enables a clean cut-off to be obtained, especially with a diode, because it projects the image of the cut-off edge forwards. The form of the cut-off in the lighting beam is therefore determined by the profile of the cut-off edge.

Another advantage of the module according to the invention is that it exploits a property of elliptical lighting modules which is that of “mixing” the images of the light source at the second focus of the first reflector, which improves the homogeneity of the lighting beam produced.

In addition, such a module has improved optical performance as compared with a system using a lens; in this connection, there are fewer losses due to the non-unitary coefficient of reflection of the reflective surfaces of the second and third reflectors than by reflections in glass within the lens.

Finally, with the configuration of the invention, the first reflector and its light source may be concealed behind one of the said second and third reflectors, so that the user, when looking at the output beam, does not see the first reflector. Such a solution does for example enable the use of a mask for the purpose of masking the first reflector and its light source to be eliminated.

Preferably, the optical axes of the said second and third reflectors are coincident.

Preferably, the said first reflector is arranged behind the said second reflector, whereby the said first reflector is hidden by the said second reflector.

Preferably, the said second reflector and the said third reflector have a focus arranged in the vicinity of the said second focus of the said first reflector.

In a preferred embodiment, the said second reflector and/or the said third reflector have a surface for reflecting light rays the cut-off of which is a parabola in one plane.

In another preferred embodiment, the said second reflector and/or the said third reflector is a reflector of the complex surface type for reflecting light rays.

In a particularly advantageous manner, the said light source is a light emitting diode.

In a particularly advantageous manner, the said cut-off edge is a chamfered edge defining an oblique surface, the said oblique surface being determined in such a way that the said cut-off edge does not intercept the rays reflected by the said first reflector and passing beyond the said second focus.

Preferably, the said second focus of the said first reflector is at the centre of the line portion which is the intersection between the said oblique surface and the said reflective top face of the said bender.

Preferably, in a first solution, the said first and third reflectors are made all in one piece, and/or the said second and fourth reflectors are made all in one piece.

Preferably, in a second solution, the said second, third and fourth reflectors are made all in one piece.

In a very advantageous embodiment, the lighting module includes a fifth reflector for directly receiving light rays issued from the said first light source, the reflective surface of the said fifth reflector being such that it produces a third portion of the cut-off beam.

Preferably, in a first solution, the said first, third and fifth reflectors are made all in one piece.

Preferably, in a second solution, the said first and fifth reflectors are made both in one piece.

Preferably, the lighting module produces a second lighting beam without any cut-off, and includes:

- a reflector, referred to as a reflector without cut-off, for producing the said second light beam without any cut-off and having an optical axis passing through the second focus of the said first reflector and at right angles to the optical axis of the said first reflector, and
- a second light source arranged in the vicinity of the focus of the said reflector without cut-off.

In this last mentioned embodiment, the reflective surface of the said reflector without cut-off may be a substantially parabolic surface to which a reduction factor is applied in a direction at right angles to the optical axis of the said first reflector and to the optical axis of the said sixth reflector.

In this last version, the said reflector without cut-off is a reflector of the complex surface type for reflection of light rays.

In accordance with another embodiment, the lighting module comprises:

- a fifth reflector symmetrical with the said first reflector with respect to the plane of the reflective top face of the said bender, and
- a second light source arranged in the vicinity of the first focus of the said fifth reflector.

Preferably in this last mentioned embodiment, the said cut-off edge is a chamfered edge defining an oblique surface, the said oblique surface being determined in such a way that the said cut-off edge does not intercept the rays reflected by the said first reflector and passing beyond the said second focus, the said oblique surface being reflective for receiving a portion of the light rays issued from the said fifth reflector; and the said module includes a sixth reflector for receiving the light rays issued from the said oblique surface, the said sixth reflector having a substantially parabolic surface for reflecting light rays with a focus arranged in the vicinity of the said second focus of the said second reflector.

Preferably, in this last mentioned embodiment, it includes a seventh reflector for directly receiving the light rays issued from the said second light source, and having a substantially parabolic surface for reflecting light rays.

In a particularly advantageous manner, the said bender has a surface for correcting the field curvature, situated along the said cut-off edge, and in continuation of the said top face of the said bender, whereby any ray issued from the said first reflector and passed towards the said third reflector does not go beyond the said cut-off.

The said corrective surface may be a surface that absorbs light, or it may be a reflective surface, and may be inclined at a predetermined angle with respect to the plane of the said reflective top face of the said bender, whereby those rays issued from the said first reflector that would have been passed above the cut-off in the absence of the said corrective surface, are entirely reflected in a direction opposed to the direction of the said first lighting beam with cut-off.

In a modified version, the first reflector has an ellipso-parabolic surface. In that case, it is of advantage to arrange that the second reflector and/or the third reflector shall be a parabolic cylinder.

In another modified version,

- the first collector reflector has a surface for reflecting light rays the cut-off of which is an ellipse in one plane, and
- at least a first light source is disposed close to the first focus of the said first collector reflector, said module comprising:

- an output reflector for producing the cut-off beam and having an optical axis passing through the second focus of the said first reflector and at right angles to the optical axis of the said first reflector, and
- a fourth reflector, referred to as a bender, which is arranged between the said first collector reflector and the said output reflector and comprising:
  - an edge, referred to as a cut-off edge, which is arranged in the vicinity of the said second focus of the said first reflector, whereby to form the cut-off in the lighting beam, and
  - a reflective top face which contains the said respective optical axis of the said first reflector.

It is then advantageous to provide that the first collector reflector be defined by an ellipso-parabolic surface, and/or that the output reflector be defined by a parabolic cylinder.

Further features and advantages of the present invention will appear in the following description of embodiments of the invention, which are given by way of illustration and are in no way limiting.

In the drawings that follow:

DESCRIPTION OF THE PREFERRED EMBODIMENTS

Figure 1:
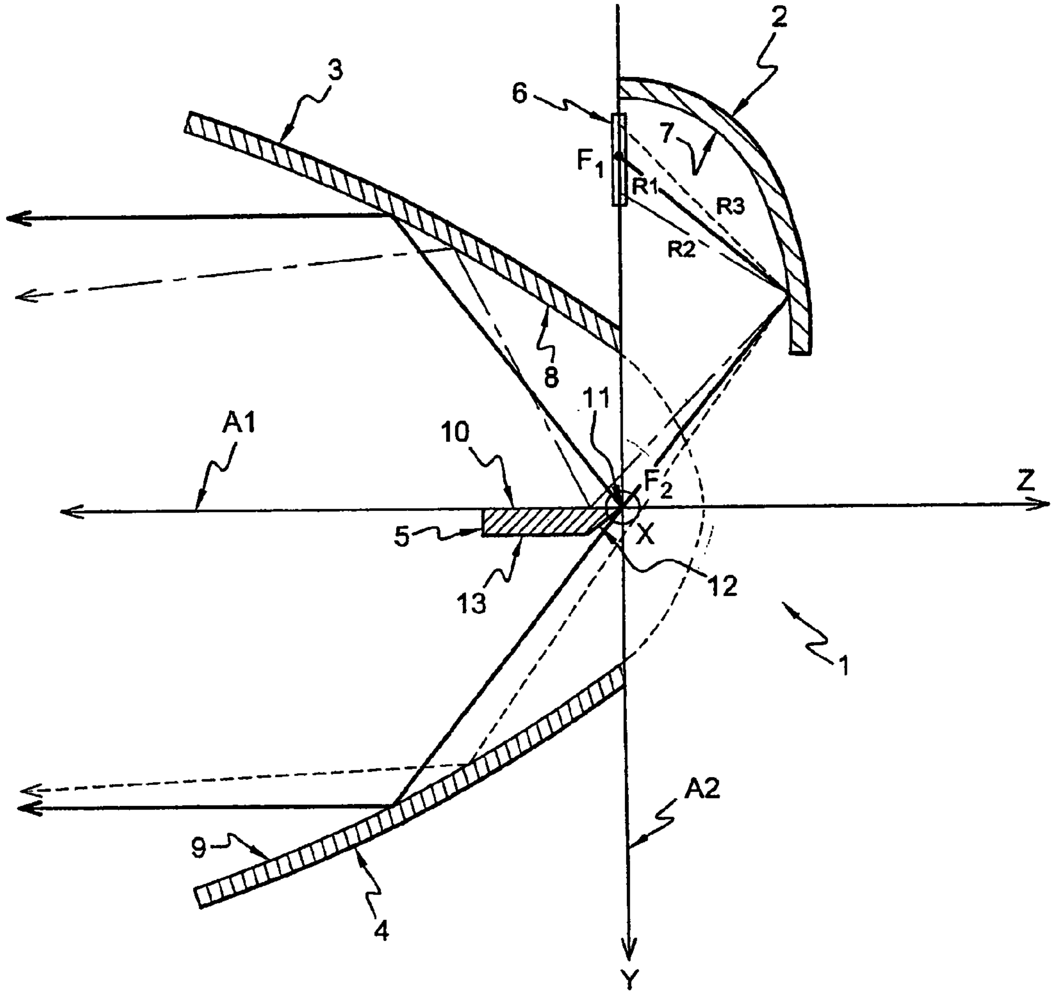
FIG. 1 shows diagrammatically a side view of a lighting module in a first embodiment of the invention, showing the path of the light rays.

In all the Figures, common elements carry the same reference numerals.

FIG. 1 shows diagrammatically a side view of a lighting module 1 for a vehicle headlight in a first embodiment of the invention.

The module 1 comprises a first reflector 2, a second reflector 3, a third reflector 4, a fourth reflector 5, and a light source 6.

The first reflector 2 is an elliptical reflector having two foci F1 and F2, an optical axis A2, and a substantially elliptical reflective surface 7.

The substantially elliptical reflective surface 7 is made in the form of an angular sector of what is substantially a body of revolution, and lies in the half space which is situated above an axial plane at right angles to the plane of the page, this plane containing the optical axis A2. In a first approximation, the surface 7 is semi-elliptical.

However, it may be noted that the surface 7 may not be perfectly elliptical, and may have a plurality of specific profiles which are arranged to optimise the distribution of light in the light beam which is produced by the module 1. This means that the first reflector 2 is not a perfect body of revolution.

The light source 6 is arranged substantially at the first focus F1 of the first reflector 2.

Preferably, the light source 6 is a light emitting diode which emits most of its light energy towards the reflective inner face of the substantially elliptical surface 7.

The diode 6 is for example a diode of gallium nitride GaN, with a phosphide so that it gives off white light.

The second reflector 3 has a focus which is substantially coincident with the second focus F2 of the first reflector 2, and also has an optical axis A1 and a reflective surface 8.

The optical axis A1 is substantially parallel to the longitudinal axis of a vehicle, not shown, which is equipped with the lighting module 1, and the optical axis A1 defines an angle equal to 90° with the optical axis A2.

The reflective surface 8 is substantially parabolic, with the axis of the parabola being the optical axis A1.

The third reflector 4 has a focus substantially coincident with the second focus F2 of the first reflector 2, an optical axis A1 identical to that of the second reflector 3, and a reflective surface 9.

A direction Y is identical and extends in the same direction as the optical axis A2, while a direction Z is identical and of opposite sense to the optical axis A1, and a direction X is such that the central origin XYZ at F2 is a direct origin.

The third reflector 4 is then substantially symmetrical with the second reflector 3 with respect to the plane (F2, X, Z). Let us however note that the symmetrical character of the second and third reflectors 3 and 4 is optional.

The fourth reflector 5, also called a bender, lies between the second reflector 3 and the third reflector 4, and has at least one reflective top face 10 and a front terminal edge 11, referred to as the cut-off edge.

The cut-off edge 11 is arranged close to the second focus F2 of the first reflector 2.

The module 1 operates as follows. We will consider, for this purpose, three light rays R1, R2 and R3 issued from the light source 6.

Since the light source 6 is located at the first focus F1 of the first reflector 2, the major part of the rays emitted by the source 6 after they have been reflected on the inner face 7 is transmitted towards the second focus F2 or into the vicinity of the latter. This is the case for the ray R1, which passes along the cut-off edge 11. R1 is then reflected on the surface 9 of the third reflector 4 in a direction substantially parallel to the optical axis A1 of the third reflector 4. Here let us note that the cut-off edge 11 has a chamfer 12 which defines an oblique surface. This oblique surface 12 is determined in such a way that the cut-off edge 11 runs no danger of intercepting rays reflected by the first reflector 2 and passing beyond the second focus F2.

Other rays may, after being reflected on the inner face 7, be reflected on the surface 10 of the bender 5; this is the case for R2. R2 will then be reflected once again on the parabolic surface 8 of the second reflector 3, and this reflection goes downwards in the plane of FIG. 1. The ray R2 is then emitted below the cut-off in the light beam. Without the reflection of R2 on the surface 10, the ray R2 will be reflected on the surface 9 of the third reflector 4, and will have been unacceptable (because it is above the cut-off line).

Other rays, of the same type as R3, may pass beyond the edge 11. In that case, the ray R3 is then reflected on the surface 9 of the third reflector 4, and is also retransmitted below the cut-off in the light beam.

The reflective surface 10 enables the images of the light source 6 which are reflected by the elliptical surface 7 of the first reflector 2 to the second focus F2 to be "bent".

The "bend" formed by this image "bending" contributes to the formation of a resultant cut-off line in the light beam reflected by the second and third reflectors 3 and 4.

The first reflector 2 is situated behind the second reflector 3, so that when the module is viewed from the front (facing the optical axis A1), the first reflector and light source 6 are not seen; these latter are obscured by the second reflector, and provision of a mask serves no purpose.

Let us note that we have considered that the second and third reflectors are perfectly symmetrical, and therefore have a common optical axis A1; they may be asymmetrical and have different optical axes, the only condition being that their optical axes are cut off at the second focus F2 of the first reflector, and lie in the same plane (F2, X, Z).

Let us also note that the rear face 13 of the bender 5 may be reflective for constructional reasons, but this reflective portion will not be used.

Figure 2:
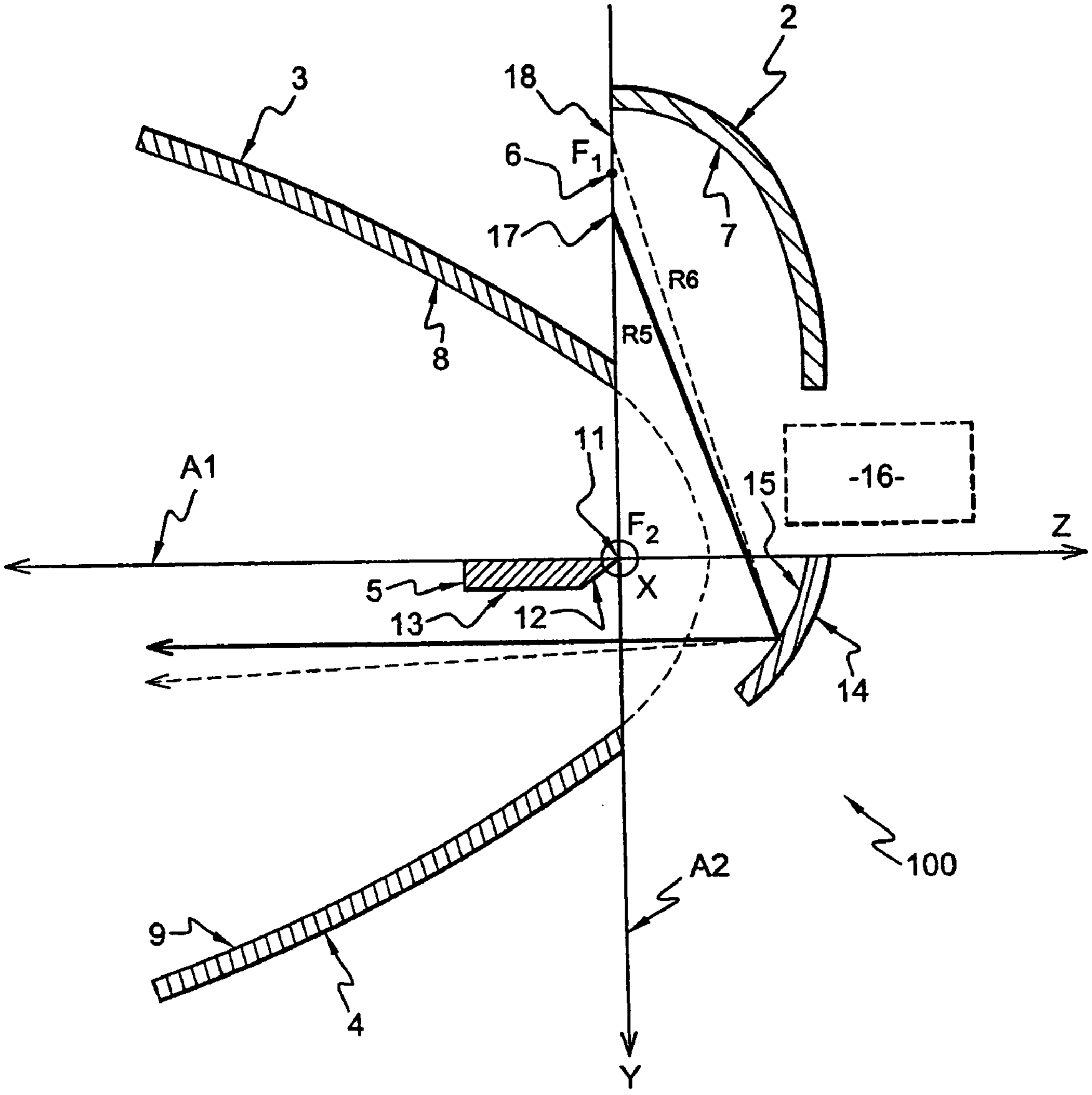
FIG. 2 shows diagrammatically a side view of a lighting module in a second embodiment of the invention, and shows the path of some light rays.

FIG. 2 shows diagrammatically a side view of a lighting module 100 for a vehicle headlight, in a second embodiment of the invention.

The module 100 is identical to the module 1 in FIG. 1, except that it also includes a fifth reflector 14.

This fifth reflector has a reflective surface 15 which receives light rays directly from the light source 6 and produces a beam of light rays below the horizontal cut-off line. If the light source 6 were a point source and not surrounded by any optical apparatus, the reflective surface 15 would be a parabolic surface with a focus situated at the second focus F2 of the first reflector.

In practice, the light source 6, such as a light emitting diode, is not a point source, and it includes a chip, not shown, with a square or rectangular surface surrounded by a spherical half lens of plastics material, also not shown, which is centred on the centre of the chip. As a result, the non-point characteristics of the source and lens must be taken into consideration in making the reflective surface 15.

Without any lens, but with only a non-point source, a complex surface may be used in order to produce the reflective surface.

Where the source is not only a non-point source but also includes a spherical lens, one solution consists in making a reflective surface from a source which is considered to be a point source, and which comes from the point 17 of the square of the chip that is closest to the fifth reflector 14.

The reflective surface 15 is then constructed in such a way that the ray R5 issued from the point 17 is parallel to the optical axis A1. The construction may take into consideration the spherical wave surface issuing from the point 17, which is then transformed into a non-spherical wave surface via its passage through the plastics half lens. This non-spherical wave surface may be determined by the use of Descartes' laws. The reflective surface 15 is so constructed as to give a flat wave surface, corresponding to a plane parallel to the optical axis A1, after reflection on the reflective surface 15 of the non-spherical wave surface previously determined. Its equation is obtained by inscribing the constancy of the optical path along a ray issued from the point 17 to a plane at right angles to the optical axis (this plane may be arbitrarily chosen, but it must be identical for all the rays concerned).

Once the reflective surface 15 has been determined, given that the point 17 is the point closest to the surface 15, the other rays, such as the ray R6, coming from the point 18 further away from the surface 15, will give rise to a ray beneath the cut-off after reflection on the surface 15.

This fifth reflector 14 enables the intensity of the cut-off beam to be substantially increased, by recuperating the light which in the absence of the fifth reflector 14 would be lost in the back of the module 100.

Let us note that the first, third and fifth reflectors 2, 4 and 14 respectively may be made all in one piece using a simple mould without a pull-out shutter, in a standard plastics material of the PPS (phenylene polysulphide type). The same is true for the second reflector 3 and the bender 5. In both cases, the reflective coating has only been deposited on one face, because there are only any reflective optical surfaces on one side.

Let us also note that the fifth reflector is able to take up a reduced space under the first reflector 2, thereby leaving a free zone 16 between the said first and fifth reflectors, in which an optical device may be inserted for carrying out some additional function, such as the production of a beam not having a cut-off, for instance a DRL (daytime running light).

Figure 3:
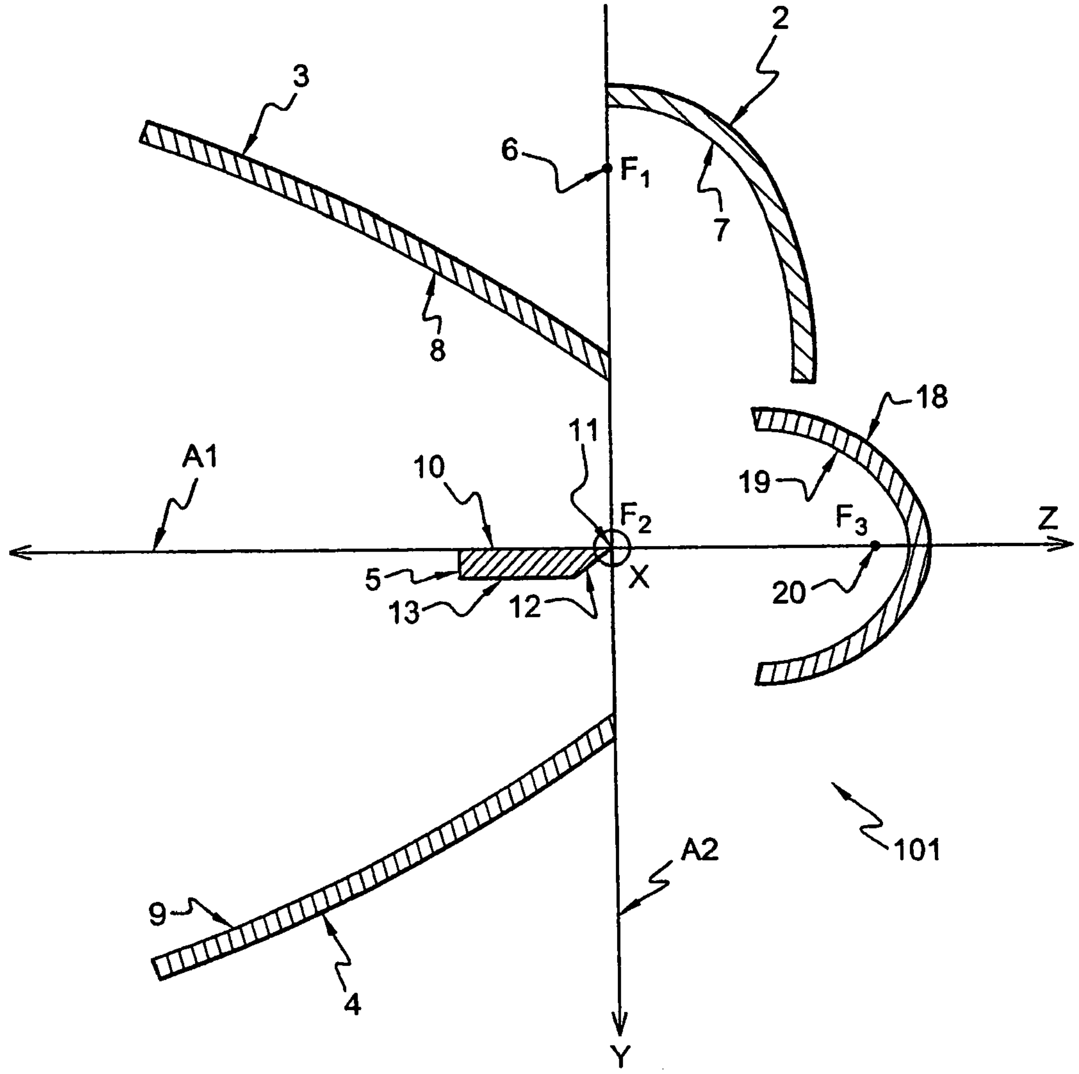
FIG. 3 shows diagrammatically a side view of a lighting module in a third embodiment of the invention.

FIG. 3 shows diagrammatically a side view of a lighting module 101 for a vehicle headlight, in a third embodiment of the invention.

The module 101 is identical to the module 1 in FIG. 1, except that it further includes a reflector 18 referred to as a reflector without cut-off, and a second light source 20.

The reflector 18 without cut-off has an internal reflective surface 19 which is substantially parabolic, an optical axis coincident with the optical axis A1 of the second and third reflectors 3 and 4, and a focus F3.

The focus F3 is positioned positively on the axis F2-Z, and the light source 20 is arranged in the vicinity of the said focus F3.

If the reflective surface 19 of the reflector 18 without cut-off were a true parabola, it would produce a substantially circular output beam without any cut-off. Now, the regulating authorities require that functions not having any cut-off, of the main beam or DRL type, should have a beam which is about twice as wide as it is high, that is to say the beam must be spread twice as far in the X direction as in the Y direction.

As a result, if it is desired to add a second function of the type without cut-off to the module 101 which conforms to the regulations, it is necessary to adapt the reflective surface 19.

A first solution consists in applying to the parabola 19 a reduction factor which is adapted along the X axis. This transformation may be carried out in a known way by optical optimisation logic methods of the CODE V type.

Another solution consists in making a complex surface for the reflective surface 19 by adding ribs on the surface as described in the documents FR 2 760 068 and FR 2 760 067.

Figure 4:
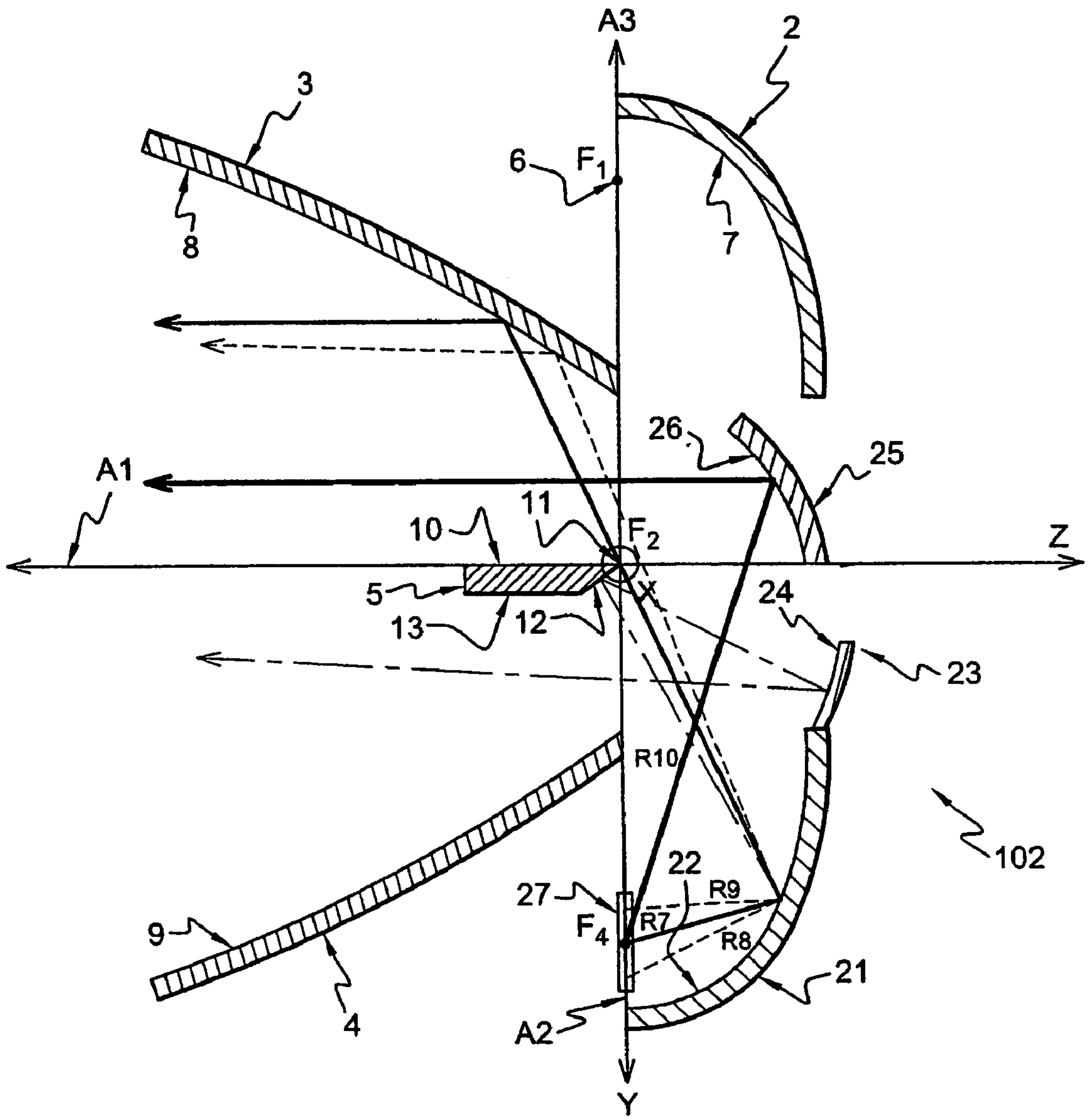
FIG. 4 shows diagrammatically a side view of a lighting module in a fourth embodiment of the invention.

FIG. 4 shows diagrammatically a side view of a lighting module 102 for a vehicle headlight in a fourth embodiment of the invention.

The module 102 is identical to the module 1 in FIG. 1, except that it further includes a fifth reflector 21, a second light source 27, a sixth reflector 23, and a seventh reflector 25.

The fifth reflector 21 is substantially symmetrical with the first reflector 2, with respect to the (F2, X, Z) plane. As a result, the first focus F4 of the fifth reflector 21 is symmetrical with the focus F1 of the first reflector 2, with respect to the second focus F2 of the first reflector 2, while the second focus of the fifth reflector is coincident with the second focus F2 of the first reflector 2.

The second light source is located substantially in the vicinity of the first focus F4 of the fifth reflector.

The reflective surface 22 of the fifth reflector 21 is therefore substantially elliptical, with an optical axis A3 which is directed in the opposite direction from the optical axis A2.

The chamfer 12 of the bender is made reflective, so that it is able to reflect some of the rays reflected on the reflective surface 22 of the fifth reflector 21.

The sixth reflector 23 receives the light rays coming from the reflective chamfer 12, the said sixth reflector 23 having a substantially parabolic surface for reflecting the light rays, with a focus located close to the second focus F2 of the first reflector 2.

The seventh reflector has a substantially parabolic reflective surface 26, which produces a beam of light rays above and below the horizontal cut-off. The reflective surface 26 has a focus which is situated at the second focus F2 of the first reflector, and is so arranged that it directly receives the light which is issued from the second source 27 and which is not reflected on the surface 22 of the fifth reflector 21.

The module 102 operates as follows.

For this purpose we will consider that four light rays R7, R8, R9 and R10 are issued from the second light source 27.

Since the second light source 27 is arranged at the first focus F4 of the fifth reflector 21, the major part of the rays emitted by the source 27, after being reflected on the internal face 22, are directed towards the second focus F2 or close to the latter. This is the case for the ray R7 which passes along the cut-off edge 11. R7 is then reflected on the surface 8 of the second reflector 3 in a direction substantially parallel to the optical axis A1 of the second reflector 3.

Other rays may, after being reflected on the internal face 22, be reflected on the reflective chamfer 12 of the bender 5; this is the case for R9. R9 will then be once again reflected on the parabolic surface 24 of the sixth reflector 23, and this reflection will be carried upwards in the plane of the drawing. The ray R9 is then emitted above the cut-off line in the light beam. This is due to the fact that the ray R9 comes from a point situated below the cut-off edge 11.

Other rays, of the same type as R8, may pass beyond the edge 11. In that case, the ray R8 is then reflected on the surface 8 of the second reflector 3, and is also re-emitted above the cut-off line in the light beam.

Finally, the rays of the R10 type, which are not intercepted by the surface 22 of the fifth reflector, are emitted towards the surface 26 of the seventh reflector 25, and are then transmitted in a beam above and below the cut-off line. The ray R10, which is shown as being reflected at the centre of the surface 26, is exactly on the cut-off line. It can however be envisaged that the surface 26 can be made in such a way that it produces a cut-off beam. This construction would for example take an identical form to the construction of a reflector 14 in FIG. 2, by reversing the beams.

Let it be noted here that, if the two light sources 6 and 27 are lit at the same time, an output beam is obtained which is of the main beam or DRL type; if the first source 6 is lit by itself, there is still a cut-off beam, which is of the passing beam or anti-fog type. The module 102 thus enables a complementary beam to be created by adding light above the cut-off line of the main beam.

It should also be noted that another arrangement consists in causing the sixth and seventh reflectors 23 and 25 to be turned through a positive angle (1° in our version), around, respectively, the X axis passing through the origin and a parallel axis which passes through the second light source 27, thereby giving an overlap between the complementary beam and the main beam (the maximum intensity of the combination is then higher, and there is no longer any risk of creating a line of contrast between the two beams).

Figure 5:
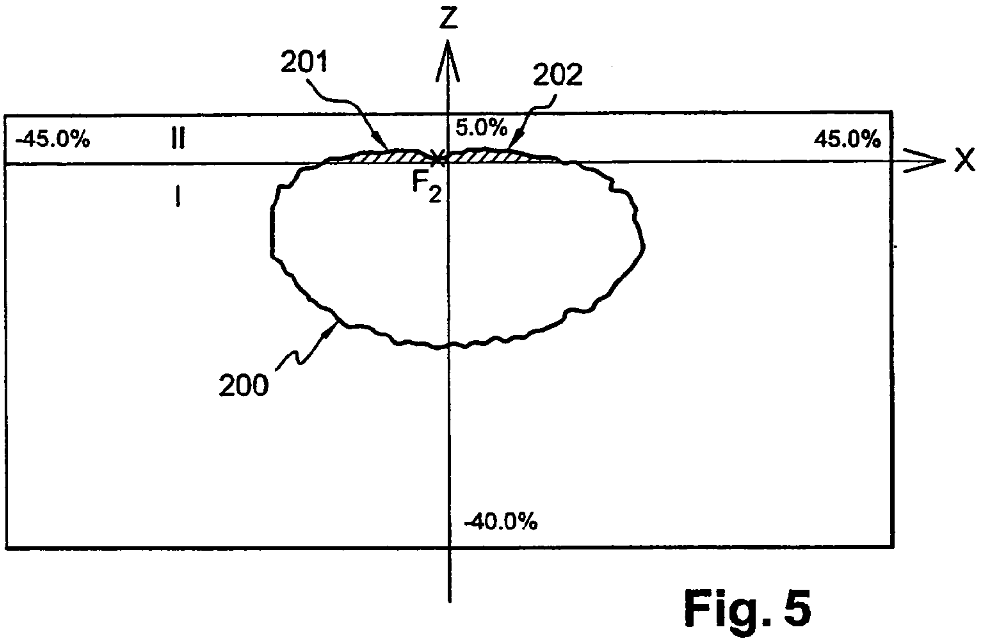
FIG. 5 shows an isolux curve of a lighting module as shown in FIG. 1, with a cut-off line uncorrected for field curvature.

FIG. 5 shows an isolux curve 200 for the lighting module 1 shown in FIG. 1, with a straight cut-off line along the X axis.

The curve 200 shows that a part of the curve which includes two fin shaped portions 201 and 202 of the light beam is above the directional limit or cut-off line which divides the illuminated surface into two zones I (without cut-off) and II (above the cut-off line).

The presence of the fin shaped portions 201 and 202 in the zone is due to the absence of any correction for field curvature, in particular after reflection on the third reflector 4. Thus, in theory, all of the rays which are incident on the reflective surface 9 and which pass along the cut-off edge 11 must be distributed horizontally. In practice, outside the paraxial approximation, the image projected by the parabolic surface 9 is never as well defined for the points situated on either side of the focus F2 in the direction X and slightly offset on the Z axis. The image of these points lies above the cut-off line, and explains the presence of the fin shaped portions 201 and 202.

As a result, it is necessary to apply a field curvature correction. One solution consists in preventing the light from passing through those points which tend to produce a beam above the horizontal. An opaque corrective surface is then added above the cut-off edge 11, such that it will prevent the rays coming from the surface 7 which are liable to be harmful from reaching the surface 9 of the third reflector 4. Such a surface, which is determined by standard computer simulation methods, is then applied to the cut-off edge 11, and has substantially the form of the hatched part shown below the fin shaped portions 201 and 202 in the (F2, X, Z) plane.

However, such an opaque surface may be difficult to make, because, during the metallising operations on the reflective surface 10 of the bender 5, it is necessary to apply spray to a small surface with a sharp edge at the end of the said reflective surface 10.

It is therefore desirable to be able simply to add a corrective surface to the edge 11, the said corrective surface remaining reflective so as to keep the manufacturing operation simple.

However, it is not possible to keep the same corrective surface as described above, since the rays destined for the surface 9 and hidden by the reflective corrective surface will then be reflected towards the surface 8 of the second reflector 3, so providing a beam above the cut-off line and thereby shifting the problem of non-correction of field curvature to the second reflector 3. One solution to this problem is shown in FIG. 6.

Figure 6:
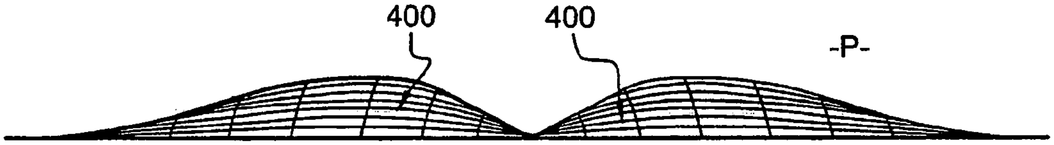
FIG. 6 shows a field curvature correcting surface used in a module as shown in FIG. 1.

FIG. 6 shows a reflective surface 400 for correcting field curvature, which is used in a module such as that shown in FIG. 1.

The surface 400 is an extension of the cut-off edge 11, and is calculated using standard computer simulation techniques so as to fulfil the following two conditions:

- first condition: it prevents the rays coming from the surface 7 and liable to be above the cut-off line from reaching the surface 9 of the third reflector 4.
- second condition: it is in a plane P which contains the axis F2-X and which is inclined at a predetermined angle, 20° in this example, with respect to the (F2, X, Z) plane, so that detrimental rays blocked by the surface 400 are reflected towards the rear of the module 1, and in no case towards the reflective surface 8 of the second reflector 3.

Figure 7:
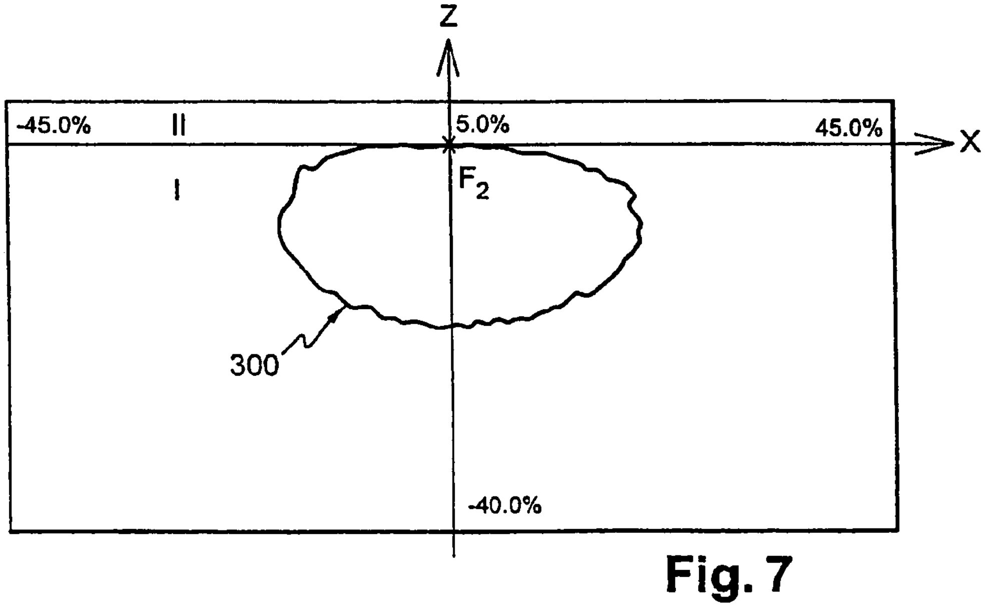
FIG. 7 shows an isolux curve for a lighting module as shown in FIG. 1, with a cut-off line the curvature of which is corrected with the surface shown in FIG. 6.

FIG. 7 shows an isolux curve 300 of a lighting module as shown in FIG. 4, having a corrected cut-off edge with the surface 400 in the plane P such as that shown in FIG. 6.

The curve 300 shows that the whole of the lighting beam is below the directional limit of the cut-off line, i.e. it is in the zone I.

The field correction surface 400 has been described with reference to FIG. 1, but it will be clear that it is all equally applicable to the other embodiments in FIGS. 2 to 4.

In all of the embodiments of FIGS. 1 to 4, a second solution for avoiding the fin shaped portions such as 201 and 202 can be found in a slight modification of the reflective surface of the first reflector 2 and the second and third reflectors 3 and 4.

It has been noted above with reference to FIG. 1 that:

- the surface 7 of the first reflector could be other than perfectly elliptical, and could have other specific profiles for optimising the light distribution in the light beam produced by the module 1, and that this would involve the first reflector 2 becoming other than a perfect surface of revolution; and
- the reflective surfaces 8 and 9 of the second reflector 3 and fourth reflector 4 were substantially parabolic.

It was also noted above, with reference to FIG. 5, that the presence of the fin shaped portions 201 and 202 in the zone II were due to the absence of field curvature correction, especially after reflection on the third reflector 4.

It is therefore possible to make use of these facts to effect a slight modification in the surfaces of the first, second and third reflectors, in order to obtain a field curvature correction and thus eliminate the fin shaped portions 201 and 202 in the beam emitted by the lighting modules 1, 100, 101 or 102 described above.

Such a field curvature correction should result in light beams not being transmitted above the cut-off line that divides the illumination surface into two zones, that is to say not to send rays into the zone II in FIG. 7. Under these conditions, the directional limit between the zones I and II can be considered as being the image at infinity of the cut-off edge 11 of the fourth reflector 5 which is formed by the second and third reflectors 3 and 4.

The invention therefore comprises making use of a straight cut-off line 11, and forming the image at infinity with the aid of the second and third reflectors 3 and 4, these latter consisting of parabolic cylinders, that is to say surfaces such as 8 or 9 in FIG. 1, which are generated by a straight segment at right angles to the plane of that Figure and impinging on the parabola 8 or 9.

The first reflector 2 must then be a surface which converts the spherical wave emitted by the light source 6 into a cylindrical wave, the generatrix of which is parallel to the cut-off edge 11.

The surface of the first reflector 2 is then easily made, and an ellipso-parabolic surface is thereby obtained, that is to say a surface for which:

a cross section of the said reflector through a horizontal plane is a parabola, and the cross section in a vertical plane containing the light source is an ellipse.

Figure 8:
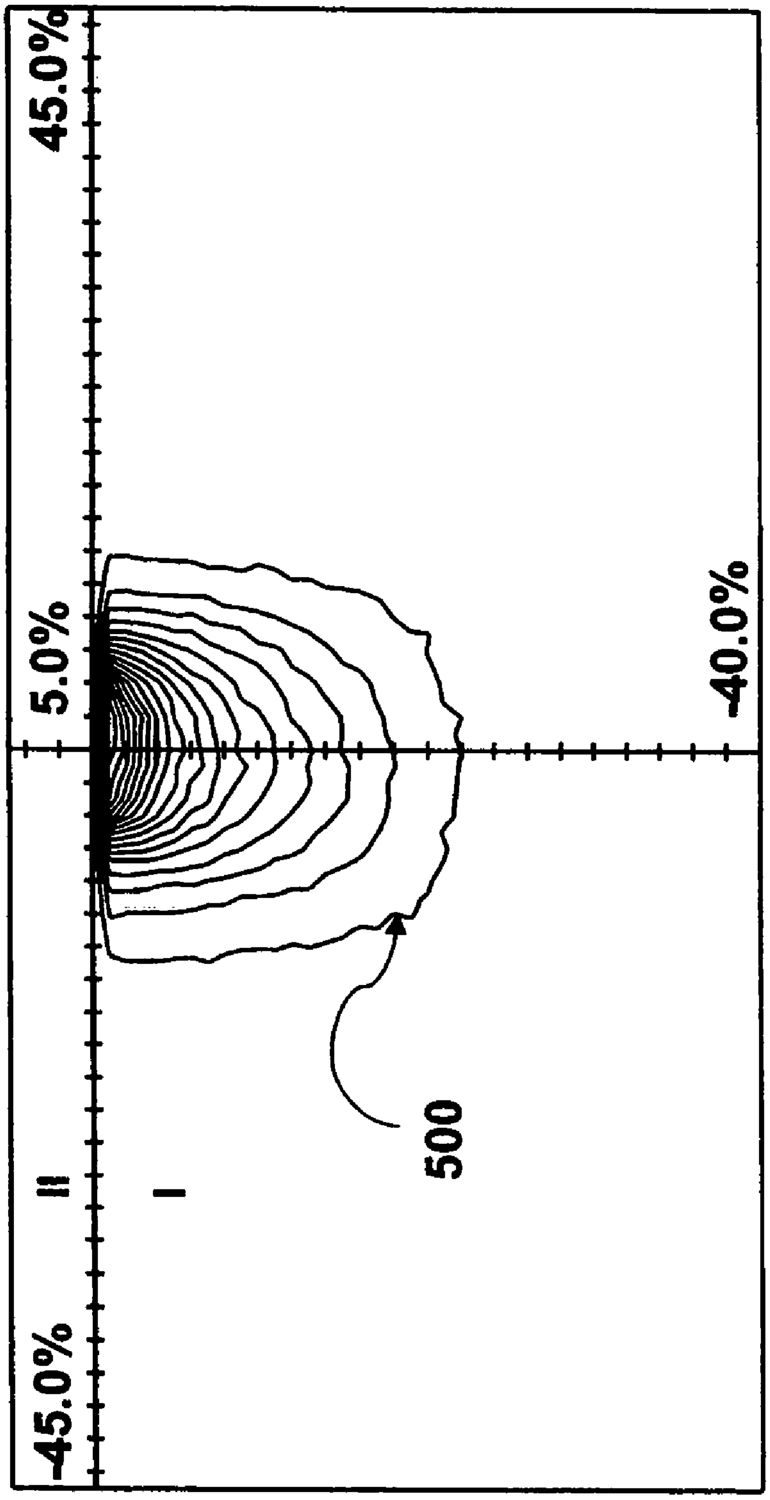
FIG. 8 is an isolux curve of a modified version of the lighting module shown in FIG. 1, with modified reflective surfaces.

Thus, by producing a lighting module the first reflector 2 of which consists of an ellipso-parabolic surface, and in which the second and third reflectors 3 and 4 are parabolic cylinders, with the fourth reflector 5, or bender, having a straight cut-off edge, the beam emitted by such a lighting module has the isolux curve 500 shown in FIG. 8.

The curve 500 shows that the whole of the light beam emitted by the lighting module just described is below the directional limit or cut-off line, i.e. it is in the zone I.

It can therefore be seen that a beam is obtained in which the cut-off is particularly neat and straight, with simple bending of the light, that is to say bending with a straight edge, and that it is all therefore very easy to make.

Figure 9:
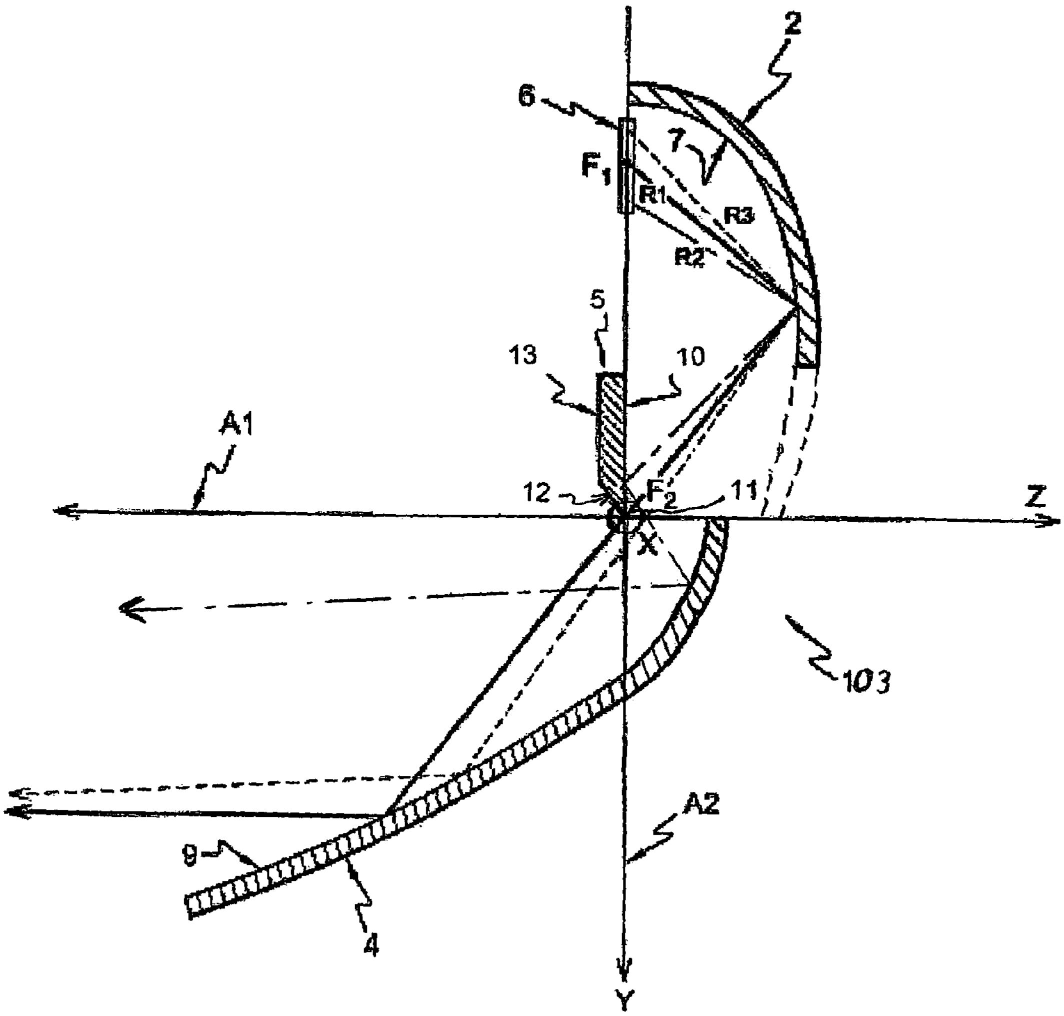
FIG. 9 shows diagrammatically a side view of a lighting module in the fifth embodiment of the invention, showing the path of the light rays.

Such a design allows the provision of another embodiment of the present invention, more particularly represented on FIG. 9.

According to this further embodiment, in the module 103, the first and third reflectors are as described above, the second reflector is withdrawn, and the bender reflector is situated such that its reflecting surface includes the optical axis A2 of the first collector reflector 2.

The operation of the module 103 is as follows.

We will still consider, for this purpose, three light rays R1, R2 and R3 issued from the light source 6.

Since the light source 6 is located at the first focus F1 of the first collector reflector 2, the major part of the rays emitted by the source 6 after they have been reflected on the inner face 7 is transmitted towards the second focus F2 or into the vicinity of the latter. This is the case for the ray R1, which passes along the cut-off edge 11. R1 is then reflected on the surface 9 of the output reflector 4 in a direction substantially parallel to the optical axis A1 of the output reflector 4. Here let us note that the cut-off edge 11 has a chamfer 12 which defines an oblique surface. This oblique surface 12 is determined in such a way that the cut-off edge 11 runs no danger of intercepting rays reflected by the first reflector 2 and passing beyond the second focus F2.

Other rays may, after being reflected on the inner face 7, be reflected on the surface 10 of the bender 5; this is the case for R2. R2 will then be reflected once again on the parabolic surface 9 of the output reflector 4, and this reflection goes downwards in the plane of FIG. 9. The ray R2 is then emitted below the cut-off in the light beam it is above the cut-off line).

Other rays, of the same type as R3, may pass beyond the edge 11. In that case, the ray R3 is then reflected on the surface 9 of the output reflector 4, and is also retransmitted below the cut-off in the light beam.

The reflective surface 10 enables the images of the light source 6 which are reflected by the elliptical surface 7 of the first reflector 2 to the second focus F2 to be "bent".

The "bend" formed by this image "bending" contributes to the formation of a resultant cut-off line in the light beam reflected by the output reflector 4.

In order to collect the maximum of the light rays emitted by the light source 6, the first collector reflector 2 can be extended up to the optical axis A1 of the output reflector 4, as represented in dotted lines on FIG. 9.

The invention is of course not limited to the embodiments just described.

What is claimed is:

1. A lighting module for a vehicle headlight, for producing a lighting beam of a cut-off type, and comprising:

a first reflector having a surface of an elliptic type for reflecting light rays, and at least a first light source disposed close to a first focus of the said first reflector, wherein the said module comprises:

a second reflector for producing a first portion of the cut-off beam and having an optical axis passing through a second focus of the first reflector and at right angles to an optical axis of the said first reflector, a third reflector for producing a second portion of the cut-off beam and having an optical axis passing through the second focus of the first reflector and at right angles to the optical axis of the said first reflector, and a fourth reflector, referred to a bender, which is arranged between the said second reflector and the said third reflector comprising:

an edge, referred to as a cut-off edge, which is arranged in the vicinity of the said second focus of the first reflector, whereby to form the cut-off in the lighting beam, and a reflective top face which contains the said respective optical axes of the said second and third reflectors.

2. A lighting module according to claim 1, wherein the said optical axes of the said second and third reflectors are coincident.

3. A lighting module according to claim 1, wherein the said first reflector is arranged behind the said second reflector, whereby the said first reflector is hidden by the said second reflector.

4. A lighting module according to claim 1, wherein the said second reflector and the said third reflector have a focus arranged in the vicinity of the said second focus of the said first reflector.

5. A lighting module according to claim 1, wherein the said second reflector and/or the said third reflector have a surface of a parabolic type for reflecting light rays.

6. A lighting module according to claim 1, wherein the said second reflector and/or the said third reflector is a reflector of the complex type for reflecting light rays.

7. A lighting module according to claim 6, wherein the said light source is a light emitting diode.

8. A lighting module according to claim 1, wherein the said cut-off edge is a chamfered edge defining an oblique surface, the said oblique surface being determined in such a way that the cut-off edge does not intercept the rays reflected by the said first reflector and passing beyond the said second focus.

9. A lighting module according to claim 8, wherein the said second focus of the said first reflector is at a centre of the line portion which is the intersection between the said oblique surface and the said reflective top face of the said bender.

10. A lighting module according to claim 1, wherein the said first and third reflectors are made all in one piece, and/or the said second and fourth reflectors are made all in one piece.

11. A lighting module according to claim 1, wherein the said second, third and fourth reflectors (3, 4, 5) are made all in one piece.

12. A lighting module according to claim 1, comprising a fifth reflector for directly receiving light rays issued from the said first light source, the reflective surface of the said fifth reflector being such that it produces a third portion of the cut-off beam.

13. A lighting module according to claim 12, wherein the said first, third and fifth reflectors are made all in one piece.

14. A lighting module according to claim 12, wherein the said first and fifth reflectors are made both in one piece.

15. A lighting module according to claim 1, for producing a second light beam without any cut-off, comprising:

- a reflector, referred to as a reflector without cut-off, for producing the said second light beam without any cut-off and having an optical axis passing through the second focus of the said first reflector and at right angles to the optical axis of the first reflector, and
- a second light source arranged in the vicinity of the focus of the said reflector without cut-off.

16. A lighting module according to claim 15, wherein the reflective surface of the said reflector without cut-off is a substantially parabolic surface which is adapted, in a direction at right angles to the optical axis of the said first reflector and to the optical axis of the said reflector without cut-off, so that the beam formed by the reflective surface of said reflector without cut-off is about twice as wide as it is high.

17. A lighting module according to claim 15, wherein the said reflector without cut-off is a reflector of the complex surface type for reflection of light rays.

18. A lighting module according to claim 1, comprising:

- a fifth reflector symmetrical with the said first reflector with respect to the plane of the reflective top face of the said bender, and
- a second light source arranged in the vicinity of the first focus of the said fifth reflector.

19. A lighting module according to claim 18, wherein:

- the said cut-off edge is a chamfered edge defining an oblique surface, the said oblique surface being determined in such a way that the said cut-off edge does not intercept the rays reflected by the said first reflector and passing beyond the second focus, the said oblique surface being reflective for receiving a portion of the light rays issued from the said fifth reflector, and
- the said module includes a sixth reflector for receiving the light rays issued from the said oblique surface, the said sixth reflector having a substantially parabolic surface for reflecting light rays with a focus located in the vicinity of the said second focus of the said second reflector.

20. A lighting module according to claim 18, comprising a seventh reflector for directly receiving the light rays issued from the said second light source, and having a substantially parabolic surface for reflecting light rays.

21. A lighting module according to claim 1, wherein the said bender has a surface for correcting the field curvature, situated along the said cut-off edge, and in continuation of the said top face of the said bender, whereby any ray issued from the said first reflector and passed towards the said third reflector does not go beyond the said cut-off.

22. A lighting module according to claim 21, wherein the said corrective surface absorbs light.

23. A lighting module according to claim 21, wherein the said corrective surface is reflective and is inclined at a predetermined angle with respect to the plane of the said reflective top face of the said bender for entirely reflecting, in a direction opposed to a direction of the said first lighting beam, the rays issued from the said first reflector that would have been passed above the cut-off in the absence of the said corrective surface.

24. A lighting module according to claim 1, wherein the first reflector is defined by an ellipso-parabolic surface.

25. A lighting module according to claim 24, wherein the second reflector is a parabolic cylinder.

26. A lighting module according to claim 24, wherein the third reflector is a parabolic cylinder.

* * * * *